United States Patent
Yoon et al.

(10) Patent No.: US 11,027,985 B2
(45) Date of Patent: Jun. 8, 2021

(54) BMW-BASED HIGH FREQUENCY DIELECTRIC CERAMIC MATERIAL AND METHOD FOR MANUFACTURING SAME

(71) Applicant: GANGNEUNG-WONJU NATIONAL UNIVERSITY INDUSTRY ACADEMY COOPERATION GROUP, Gangneung-si (KR)

(72) Inventors: Sang Ok Yoon, Gangneung-si (KR); Shin Kim, Gangneung-si (KR); Chang Bae Hong, Gangneung-si (KR)

(73) Assignee: Chang Yong Oh

(*) Notice: Subject to any disclaimer, the term of this patent is extended or adjusted under 35 U.S.C. 154(b) by 0 days.

(21) Appl. No.: 16/499,862

(22) PCT Filed: Feb. 26, 2018

(86) PCT No.: PCT/KR2018/002315
§ 371 (c)(1),
(2) Date: Oct. 25, 2019

(87) PCT Pub. No.: WO2018/182180
PCT Pub. Date: Oct. 4, 2018

(65) Prior Publication Data
US 2020/0109061 A1   Apr. 9, 2020

(30) Foreign Application Priority Data

Mar. 31, 2017 (KR) .................. 10-2017-0041421
Feb. 21, 2018 (KR) .................. 10-2018-0020807

(51) Int. Cl.
*C01G 41/00* (2006.01)
*H01B 3/12* (2006.01)
*C04B 35/495* (2006.01)

(52) U.S. Cl.
CPC .......... *C01G 41/006* (2013.01); *H01B 3/12* (2013.01); *C01P 2002/52* (2013.01); *C01P 2006/40* (2013.01)

(58) Field of Classification Search
CPC ..... C01G 41/006; H01B 3/12; C01P 2002/52; C01P 2006/40; C04B 35/01; C04B 35/495
(Continued)

(56) References Cited

U.S. PATENT DOCUMENTS

| | | | |
|---|---|---|---|
| 5,834,405 A | 11/1998 | Ahn et al. | |
| 2003/0104922 A1* | 6/2003 | Sue | .......... C04B 35/50 501/134 |
| 2005/0122639 A1 | 6/2005 | Okamatsu et al. | |
| 2017/0341950 A1* | 11/2017 | Hill | ......... C04B 35/495 |

FOREIGN PATENT DOCUMENTS

| | | |
|---|---|---|
| CN | 1417161 A | 5/2003 |
| CN | 1524792 A | 9/2004 |

(Continued)

OTHER PUBLICATIONS

Furuya, Mitsuru. "Microwave dielectric properties and characteristics of polar lattice vibrations for Ba (Mg ⅓ Ta ⅔) O 3-A (Mg ½ W ½) O 3 (A=Ba, Sr, and Ca) ceramics." Journal of applied physics 85.2 (1999): 1084-1088. (Year: 1999).*

(Continued)

*Primary Examiner* — Karl E Group
*Assistant Examiner* — Cameron K Miller
(74) *Attorney, Agent, or Firm* — Renaissance IP Law Group LLP

(57) ABSTRACT

The present invention relates to a dielectric ceramic material for resonators, filters, and oscillators being used in a wireless communication system and, most particularly, to a $Ba(Mg_{0.5}W_{0.5})O_3$-type high frequency dielectric ceramic material having an appropriate dielectric constant and a high (Continued)

quality factor in a high frequency band and a method for preparing the same. For this, $Ba(Mg_{0.5}W_{0.5})O_3$ has been chosen as a material having excellent high frequency dielectric properties. At this point, an alkali metal or alkaline earth metal element partly substitutes Barium (Ba), and, for compensation, a metal of a +3 oxidation state is added quantitatively in the place of Magnesium (Mg). Accordingly, a high frequency dielectric ceramic material compound having a high quality factor and a stable temperature property is prepared. When needed, a metal of a +5 oxidation state may be further added quantitatively in the place of Tungsten (W).

8 Claims, 3 Drawing Sheets

(58) Field of Classification Search
USPC .................................................. 501/135, 108
See application file for complete search history.

(56) References Cited

FOREIGN PATENT DOCUMENTS

| CN | 102765938 A | 11/2012 |
|----|-------------|---------|
| EP | 0881199 A1 | 12/1998 |
| JP | H06187828 A | 7/1994 |
| JP | 2002087881 A | 3/2002 |

OTHER PUBLICATIONS

Bian, Jianjiang, et al. "Structural stability and microwave dielectric properties of (1-x) Ba (Mg½W½) O3-xBa (REe⅔W⅓) O3 (RE= Sm, Dy, Y, Yb) solid solutions." Journal of the European Ceramic Society 35.5 (2015): 1431-1439. (Year: 2015).*

Bai, Xue-Jiao, et al. "Low-temperature sintering and microwave dielectric properties of LiF-doped Ba (Mg½W½) O3-TiO2 ceramics." Journal of Alloys and Compounds 667 (2016): 146-150. (Year: 2016).*

* cited by examiner

BMW-BASED HIGH FREQUENCY DIELECTRIC CERAMIC MATERIAL AND METHOD FOR MANUFACTURING SAME

FIELD OF THE INVENTION

The present invention relates to a dielectric ceramic material for resonators, filters, and oscillators being used in a wireless communication system and, most particularly, to a $Ba(Mg_{0.5}W_{0.5})O_3$-type high frequency dielectric ceramic material having an appropriate dielectric constant and a high quality factor in a high frequency band and a method for preparing the same. For this, $Ba(Mg_{0.5}W_{0.5})O_3$ has been chosen as a material having excellent high frequency dielectric properties. At this point, an alkali metal or alkaline earth metal element partly substitutes Barium (Ba), and, for compensation, a metal of a +3 oxidation state is added quantitatively in the place of Magnesium (Mg). Accordingly, a high frequency dielectric ceramic material compound having a high quality factor and a stable temperature property is prepared. When needed, a metal of a +5 oxidation state may be further added quantitatively in the place of Tungsten (W).

BACKGROUND ART

Recently, with the outstanding development in the wireless communication industry, microwave dielectric ceramics are being actively applied to mobile phones, wireless Local Area Network (LAN), Global Position Satellite (GPS), military radar systems, Intelligent Transport System (ITS), and so on. And, dielectric ceramics for resonators, filters, and oscillators that are being used in such systems require an appropriate dielectric constant ($\varepsilon_r$), a high quality factor (Q×f), a temperature coefficient ($\tau_f$) that is near to zero (0).

Additionally, due to the vast increase in information size resulting from the development in wireless communication and the saturation of communication frequency bands, frequency bands that are used are becoming wider, and components for high-quality high frequency transmission/reception that can satisfy such requirements are desperately needed. Accordingly, the need for a material having a lower dielectric constant ($\varepsilon_r$) and a higher quality factor (Q×f) even in a high frequency band is increasing.

Meanwhile, a wide range of ceramic materials being used as a dielectric resonator in a microwave region is being developed. For example, $Ba(Mg_{0.33}Ta_{0.67})O_3$ (BMT; $\varepsilon_r=24$, Q×f=250,000 GHz) and $Ba(Zn_{0.33}Ta_{0.67})O_3$ (BZT; $\varepsilon_r=29$, Q×f=150,000 GHz), which are complex perovskites, have already been in commercial usage.

Recently, extensive research has been carried out on $Ba(Mg_{0.5}W_{0.5})O_3$(BMW; $\varepsilon_r=21$, Q×f=170,000 GHz), which is the base composition of the present invention, and this is partly being commercially used.

$Ba(Mg_{0.5}W_{0.5})O_3$(BMW) has a complex perovskite crystal structure and has the physical properties of $\varepsilon_r=16.7$, Q×f=42,000 GHz, and $\tau_f=-25$ ppm/° C. Herein, the high quality factor (Q×f) of $Ba(Mg_{0.5}W_{0.5})O_3$ results from one-to-one (1:1) regulation (or ordering) of B-site elements. And, generally, this enhances the high frequency dielectric properties through modifications in the composition.

Presented below are prior arts that are related to the above-described BMW.

In the U.S. Pat. No. 6,835,685B2 (Dec. 28, 2004), the Laid-Open Japanese Patent Application No. 2002-087881 (Mar. 27, 2002), and the Chinese Patent Application No. CN 1264779C (Jul. 19, 2006), the dielectric properties are enhanced by a combination of substituting (or replacing) Barium (Ba) with 1-15 mol % of Strontium (Sr) and adding 1~10 mol % of a rare earth oxide ($RE_2O_3$).

Additionally, the U.S. Pat. No. 5,432,135 (Jul. 11, 1995) discloses a high frequency dielectric ceramic material that can enhance the dielectric properties by controlling the composition ratio of the basic elements Barium (Ba), Magnesium (Mg), and Tungsten (W) and by using Yttrium oxide, Titanium oxide, Manganese oxide, and so on, as additives.

Additionally, in the Laid-Open Japanese Patent Application No. 2000-044338 (Feb. 15, 2000), the dielectric properties are varied by substituting (or replacing) Barium (Ba) partly with Strontium (Sr) and by substituting (or replacing) Magnesium (Mg) with a predetermined amount of Zinc (Zn), Nickel (Ni), and Cobalt (Co) in the $Ba(Mg_{0.5}W_{0.5})O_3$-type high frequency dielectric ceramic material, and, in U.S. Pat. No. 5,268,341 (Dec. 7, 1993), the temperature coefficient (if) of a resonant frequency is enhanced by replacing Tungsten with Tantalum (Ta).

Furthermore, the Chinese Patent Application No. CN 102765938B (Apr. 2, 2014) discloses a high frequency dielectric ceramic material than can enhance the dielectric properties by substituting (or replacing) Magnesium (Mg) with Yttrium oxide ($Y_2O_3$) or some of the rare earth oxides ($RE_2O_3$), and Zirconium oxide ($ZrO_2$) and then by adding 1 mol % of Manganese oxide ($MnO_2$) in combination in the $Ba(Mg_{0.5}W_{0.5})O_3$-type high frequency dielectric ceramic material.

Meanwhile, the Korean Patent Application No. 10-2017-0041421 (Mar. 31, 2017) discloses an excellent high frequency dielectric ceramic material having a high quality factor by substituting (or replacing) Barium (Ba) partly with an alkali metal element, such as Sodium (Na), and so on, and by quantitatively adding a metal of a +3 oxidation state, such as Yttrium (Y) in the place of Magnesium (Mg), for compensation, in the $Ba(Mg_{0.5}W_{0.5})O_3$-type high frequency dielectric ceramic material.

However, the dielectric properties of the $Ba(Mg_{0.5}W_{0.5})O_3$-type high frequency dielectric ceramic material that is disclosed in the aforementioned prior arts are varied (or changed) in accordance with the element or additive substituting (or replacing) each of the initial elements. Most particularly, the temperature coefficient of a resonant frequency is significantly influenced (or affected) by any minute change in the crystal structure according to the employment of another element. And, accordingly, the aforementioned prior arts are disadvantageous in that they are incapable of specifically resolving such problems.

Therefore, the present invention has been devised in order to enhance the temperature coefficient of a resonant frequency of a dielectric material. An excellent high frequency dielectric ceramic material having a high quality factor and a stable temperature property may be developed only in a case where an appropriate additive is selected based on the size or valence of a replacement (or substitution) element that is related to the crystal structure and where an appropriate amount of the selected additive is added.

Additionally, due to the full-scale adoption of the $5^{th}$ generation communication in the near future, a high-quality high frequency transmission/reception is needed to be performed on a frequency band of several tens of GHz. And, accordingly, a high frequency dielectric ceramic material having a lower dielectric constant ($\varepsilon_r$), a higher quality factor (Q×f), and a stable temperature coefficient of a resonant frequency is being required.

DETAILED DESCRIPTION OF THE INVENTION

Technical Objects

The present invention has been devised to resolve the above-described problems, and, accordingly, an object of the present invention is to provide a high frequency dielectric ceramic material that is configured to have a more appropriate dielectric constant, and, for example, to have a high quality factor equal to or more than 100,000 GHz and, preferably, equal to or more than 150,000 GHz, in order to eliminate noise and to perform efficient transmission/reception, and to have a temperature coefficient of a resonant frequency that is enhanced to a range within ±10 ppm/° C. in order to achieve temperature stability in a receiving/transmitting frequency.

In order to prevent formation of lattice defects and 2nd phases according to the employment of other elements in $Ba(Mg_{0.5}W_{0.5})O_3$ having excellent high frequency dielectric properties, the present invention may create a high frequency dielectric ceramic material having a high quality factor by forming a combination having a high quality factor by partly substituting Barium (Ba) with an alkali metal element, such as Sodium (Na), and so on, and by adding, for compensation, an appropriate amount of a metal element of a +3 oxidation state, such as Yttrium (Y), in the place of Magnesium (Mg) and having an excellent temperature property of a resonant frequency by adding an alkaline earth metal element (Group 2a element), such as Strontium (Sr) in the place of Barium (Ba).

Furthermore, by quantitatively adding a separate (or independent) or additional metal element of a +5 oxidation state, such as Tantalum (Ta) in the place of Tungsten (W), the excellent properties may be further enhanced.

Technical Solutions

In order to achieve the above-described technical objects of the present invention, provided herein is a BMW-type high frequency dielectric ceramic material being configured of a $(Ba_{1-a-b}Ma_aMb_b)(Mg_{0.5-c}Mc_cW_{0.5})O_3$ composition, wherein Ma and Mb may respectively represent an alkali metal and an alkaline earth metal, wherein Mc may represent a metal of a +3 oxidation state, wherein each of a and c may be within a range of 0.01 to 0.1, and wherein b may be within a range of 0.09 to 0.25.

Preferably, the $(Ba_{1-a-b}Ma_aMb_b)(Mg_{0.5-c}Mc_cW_{0.5-e}Me_e)O_3$ composition may be configured by further substituting part of W with Me, Me being a metal element of a +5 oxidation state, and e may be within a range of 0.01 to 0.05.

Preferably, the Ma may be an alkali metal element of a +1 oxidation state being indicated as $Ma_2O$, and any one of Na, K, and Li may be selected as the Ma.

Preferably, the Mb may be an alkaline earth metal element of a +2 oxidation state being indicated as MbO, and any one of Sr and Ca may be selected as the Mb.

Preferably, the Mc may be a Lanthanide group metal element of a +3 oxidation state being indicated as $Mc_2O_3$, and any one of Sc, Y, Sm, Gd, Yb, and Dy may be selected as the Mc, or the Mc may be a Boron group metal element being indicated as $Mc_2O_3$, and In may be selected as the Mc.

Preferably, the Me may be a Vanadium group metal element of a +5 oxidation state being indicated as $Me_2O_5$, and any one of Nb and Ta may be selected as the Me.

Preferably, the Ma and the Mb may be both added for a purpose of achieving a high quality factor.

Preferably, the Mb and the Me may be separately or both added for a purpose of achieving a temperature property of a resonant frequency.

Effects of the Invention

As described above, according to the present invention, the high frequency dielectric material has a more appropriate dielectric constant, and an effect of achieving a high quality factor may be expected.

Additionally, since the high quality dielectric ceramic material according to the present invention has a temperature coefficient within a stable range (e.g., within ±10 ppm/° C.), an effect of gaining good dielectric properties may be expected.

Furthermore, by using the high quality dielectric ceramic material according to the present invention, an effect of being capable of performing high-quality high frequency transmission/reception within a frequency band of several tens of GHz may be expected.

BEST MODE FOR CARRYING OUT THE INVENTION

Figure 1:
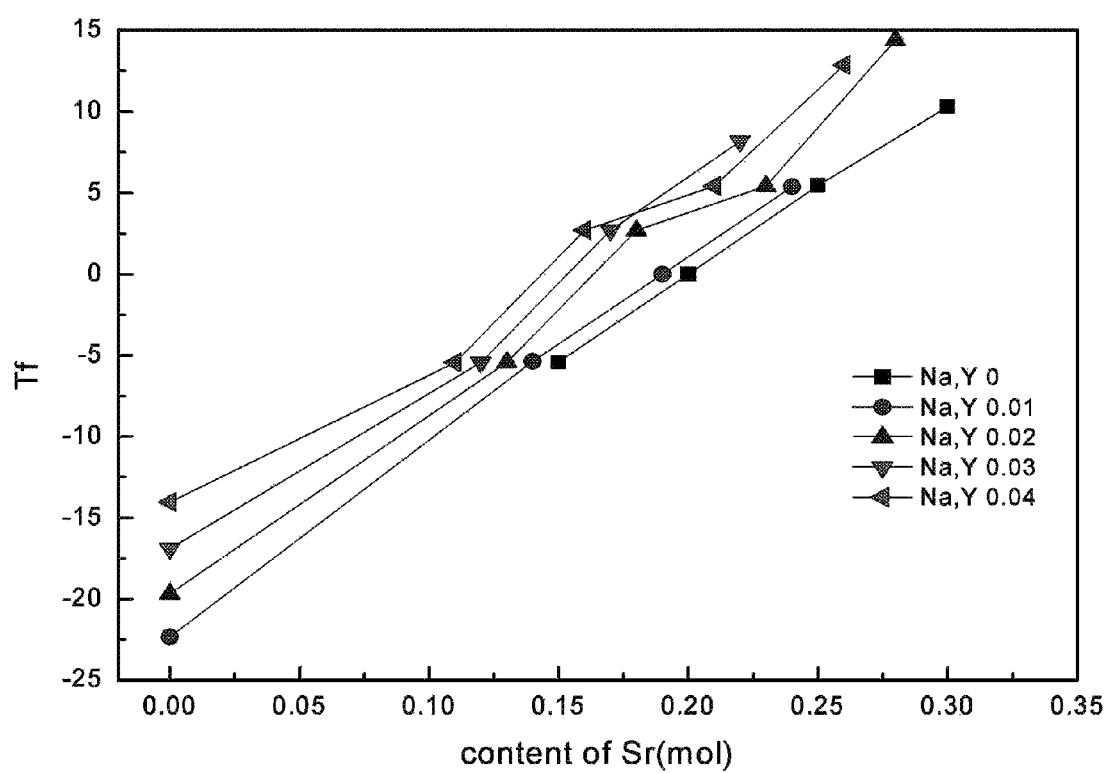
FIG. 1 is a graph showing changes in a temperature coefficient of a resonance frequency according to Mb content in a $(Ba_{1-a-b}Ma_aMb_b)(Mg_{0.5-c}Y_cW_{0.5-e}Me_e)O_3$-type high frequency dielectric ceramic material according to an exemplary embodiment of the present invention.

Hereinafter, preferred embodiments of the present invention will be described in detail with reference to the appended drawings. Additionally, when describing the present invention, if it is determined that the detailed description of the disclosed related configuration or functions may cause ambiguity in the principles of the present invention, the detailed description of the same will be omitted for simplicity.

When describing the present invention, the terms that are used in this specification have been defined based on the functions of the present invention. And, since the meaning of such terms may be varied or changed in accordance with the intentions or practice (or usage) of anyone skilled in the art, the terms used herein shall be defined in accordance with the overall context of this specification.

Before describing the present invention in detail, it shall be understood that an excellent ceramic dielectric is required to have the following properties. More specifically, an excellent ceramic dielectric resonator requires the properties of an appropriate dielectric constant, a high quality factor, and a temperature coefficient of a resonating frequency within ±10 ppm/° C. In other words, it will be advantageous for a value of the temperature coefficient to converge with 0.

The ceramic material according to the present invention are prepared by using the following preparation methods.

As starting materials, BaCO$_3$ (purity: 99.5%) of SAKAI Chem. Ind. Co., Ltd (Japan), Na$_2$CO$_3$ (purity: 99.5%) of Samchun Pure Chemical Co., Ltd (Republic of Korea), and MgO (purity: 99%), Y$_2$O$_3$ (purity: 99.9%), SrCO$_3$ (purity: 99.9%), CaCO$_3$ (purity: 99.5%), Ta$_2$O$_5$ (purity: 99.9%), Nb$_2$O$_5$ (purity: 99.9%), and WO$_3$ (purity: 99.9%) of Kojundo Chem. Lab. Co., Ltd (Japan) were used.

The starting materials are weighed to be in accordance with the diverse exemplary embodiments shown in [Table 1] and [Table 2], which will hereinafter be described in detail. Then, a zirconia ball and ethanol are put into a polyethylene container and then mixed for 24 hours.

After drying the mixed materials, the mixed material is inserted in a metallic mold having a diameter of 25 mm and processed with uniaxial pressing and then the processed mixture is calcined at 900~1100° C. for 10 hours. The calcined green compact is then processed with ball milling by using the aforementioned mixing method, and, then, the ball-milled mixture is placed in an oven and dried at 110~120° C. for 24~48 hours.

Subsequently, the dried powder is inserted in a metallic mold having a diameter of 15 mm and processed with uniaxial pressing using a pressure of 50 MPa. At this point, the calcination temperature and time are respectively set to 1600~1700° C. and 1 hour, and a heating rate and a cooling rate to 1200° C. are both set to 5° C./min.

Linear shrinkage of the sintered compound is measured by using the above-described method, and the sintered compound is ground to powder. And, an X-ray diffraction analysis (D/MAX-2500V/PC, Rigaku, Japan) is performed on the ground powder. Additionally, among the high frequency dielectric properties, by using different types of Network Analyzers, the quality factor (Q×f) and the temperature coefficient ($\tau_f$) were measured by using the cavity method, and the dielectric constant was measured by using the Hakki-Coleman method. Furthermore, model No. R3767CG (Advantest, Japan) was used for the temperature coefficient, and model No. E5071C (Keysight, U.S.A.) was used for the quality factor and the dielectric constant.

In the present invention, changes in the temperature properties of a resonant frequency were observed by quantitatively and separately or collectively adding alkaline earth metal elements (Group 2a), such as Strontium (Sr), in the place of Barium (Ba) and metal elements of a +5 oxidation state, such as Tantalum (Ta), in the place of Tungsten (W). [Table 1] shows experimental evaluations of adding alkaline earth metal elements (Group 2a), such as Strontium (Sr), in the place of Barium (Ba), and [Table 2] shows experimental evaluations of quantitatively adding Tantalum (Ta) in the place of Tungsten (W).

As shown in [Table 1], comparative evaluations have been made between comparative examples corresponding to the results disclosed in the Korean Patent Application No. 10-2017-0041421 and the exemplary embodiments according to the present invention. Physical properties of the comparative evaluation subject correspond to sinterability and dielectric properties. In the comparative example, most particularly, a temperature coefficient being lower than −10 ppm/° C. was observed. However, this is an unpreferable result. Even if the temperature coefficient has been recorded to be within the range of −10 ppm/° C., in the comparative example, there were many cases where the quality factor marked a significantly low value.

TABLE 1

| Number | Composition (mol %) | | | | | | Shrinkage (%) | $\varepsilon_r$ | Q × f (GHz) | $\tau_f$ (ppm/° C.) |
| --- | --- | --- | --- | --- | --- | --- | --- | --- | --- | --- |
| | BaO | SrO | Na$_2$O | MgO | Y$_2$O$_3$ | WO$_3$ | | | | |
| Comparative Example 1 | 100 | 0 | Na | 0 | Y | 0 | 50 | 17.53% | 17.60 | 57300 | −25.00 |
| Comparative Example 2 | 97 | 1 | Na | 2 | 48 | Y | 2 | 50 | 24.20% | 18.65 | 271290 | −16.42 |
| Comparative Example 3 | 96 | 2 | Na | 2 | 48 | Y | 2 | 50 | 24.66% | 18.65 | 254909 | −13.78 |
| Comparative Example 4 | 95 | 3 | Na | 2 | 48 | Y | 2 | 50 | 24.40% | 18.68 | 241074 | −13.76 |
| Comparative Example 5 | 94 | 4 | Na | 2 | 48 | Y | 2 | 50 | 23.40% | 18.69 | 251841 | −13.74 |
| Comparative Example 6 | 93 | 5 | Na | 2 | 48 | Y | 2 | 50 | 24.46% | 18.89 | 239341 | −13.69 |
| Comparative Example 7 | 92 | 6 | Na | 2 | 48 | Y | 2 | 50 | 24.40% | 19.07 | 210021 | −13.21 |
| Comparative Example 8 | 91 | 7 | Na | 2 | 48 | Y | 2 | 50 | 24.60% | 18.98 | 196833 | −11.93 |
| Comparative Example 9 | 90 | 8 | Na | 2 | 48 | Y | 2 | 50 | 23.73% | 18.98 | 192519 | −11.24 |
| Comparative Example 10 | 85 | 15 | Na | 0 | 50 | Y | 0 | 50 | 23.87% | 19.38 | 77147 | −5.42 |
| Comparative Example 11 | 80 | 20 | Na | 0 | 50 | Y | 0 | 50 | 24.47% | 19.58 | 72315 | 0.00 |
| Comparative Example 12 | 75 | 25 | Na | 0 | 50 | Y | 0 | 50 | 24.13% | 19.66 | 49124 | 5.36 |
| Comparative Example 13 | 70 | 30 | Na | 0 | 50 | Y | 0 | 50 | 25.27% | 20.25 | 85866 | 10.3 |
| Exemplary Embodiment 1 | 85 | 14 | Na | 1 | 49 | Y | 1 | 50 | 23.73% | 18.89 | 240413 | −5.37 |
| Exemplary Embodiment 2 | 85 | 13 | Na | 2 | 48 | Y | 2 | 50 | 24.93% | 19.43 | 203677 | −5.41 |
| Exemplary Embodiment 3 | 85 | 12 | Na | 3 | 47 | Y | 3 | 50 | 24.33% | 19.73 | 188072 | −5.43 |
| Exemplary Embodiment 4 | 85 | 11 | Na | 4 | 46 | Y | 4 | 50 | 22.80% | 19.36 | 168124 | −5.43 |

TABLE 1-continued

| Number | Composition (mol %) | | | | | | | | | Shrinkage (%) | $\varepsilon_r$ | Q × f (GHz) | $\tau_f$ (ppm/° C.) |
|---|---|---|---|---|---|---|---|---|---|---|---|---|---|
| | BaO | SrO | Na$_2$O | | MgO | Y$_2$O$_3$ | | WO$_3$ | | | | | |
| Exemplary Embodiment 5 | 80 | 19 | Na | 1 | 49 | Y | 1 | 50 | | 24.47% | 19.39 | 193794 | 0.00 |
| Exemplary Embodiment 6 | 80 | 18 | Na | 2 | 48 | Y | 2 | 50 | | 25.93% | 19.71 | 161269 | 2.70 |
| Exemplary Embodiment 7 | 80 | 17 | Na | 3 | 47 | Y | 3 | 50 | | 24.33% | 19.5 | 162180 | 2.71 |
| Exemplary Embodiment 8 | 80 | 16 | Na | 4 | 46 | Y | 4 | 50 | | 23.93% | 19.32 | 150436 | 2.71 |
| Exemplary Embodiment 9 | 75 | 24 | Na | 1 | 49 | Y | 1 | 50 | | 25.20% | 18.76 | 189083 | 5.37 |
| Exemplary Embodiment 10 | 75 | 23 | Na | 2 | 48 | Y | 2 | 50 | | 25.53% | 19.31 | 162618 | 5.43 |
| Exemplary Embodiment 11 | 75 | 22 | Na | 3 | 47 | Y | 3 | 50 | | 24.60% | 19.42 | 156668 | 8.17 |
| Exemplary Embodiment 12 | 75 | 21 | Na | 4 | 46 | Y | 4 | 50 | | 23.07% | 18.97 | 148661 | 5.43 |

Figure 2:
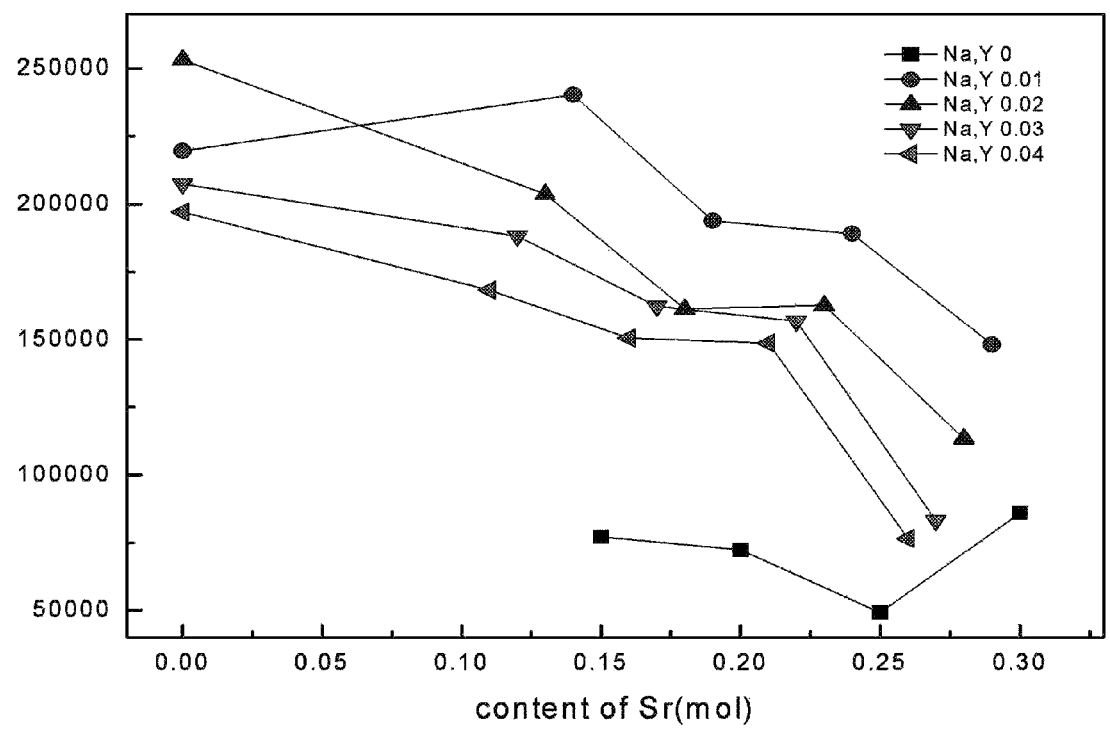
FIG. 2 is a graph showing changes in a quality factor of a resonance frequency according to Mb content in a $(Ba_{1-a-b}Ma_aMb_b)(Mg_{0.5-c}Y_cW_{0.5-e}Me_e)O_3$-type high frequency dielectric ceramic material according to an exemplary embodiment of the present invention.

As shown in Table 1, which is presented above, it will be apparent that, in the aspect of shrinkage, sufficient sintering shrinkage of 20% or more is achieved in all of the exemplary embodiments and the comparative examples. Thus, no problem occurs in the sintering properties. Meanwhile, among the high frequency dielectric properties, the dielectric constant ($\varepsilon_r$) marks approximately 18 to 20 showing no significant change. However, it is shown that the temperature coefficient of the resonant frequency linearly varies (or changes) in accordance with the Strontium (Sr) content, as shown in FIG. 1. It is also shown that the temperature coefficient connectively varies (or changes) also in accordance with the Sodium (Na) and Yttrium (Y) contents. More specifically, it is shown that the temperature coefficient of the resonant frequency can be efficiently controlled by performing substitution (or replacement) with Strontium (Sr) along with Sodium (Na) and Yttrium (Y) rather than performing separate (or independent) substitution with Strontium (Sr) only. Meanwhile, as shown in FIG. 2, the quality factor gradually decreases in accordance with the Strontium (Sr) content and then decreases abruptly starting from 0.25 mol. It is also shown that, in accordance with the Sodium (Na) and Yttrium (Y) contents, the quality factor increases significantly at 0.01 mol, as compared to the case where Sodium (Na) and Yttrium (Y) are not added, and, then, the quality factor decreases gradually after 0.01 mol. Therefore, at least 0.01 mol of Sodium (Na) and Yttrium (Y) shall be added, and, although it is not shown in the table, it is preferable to add up to a maximum of 0.1 mol of Sodium (Na) and Yttrium (Y). This also applies to other alkali metals (K, Li, and so on) and metal elements being in a +3 oxidation state (Al, Ga, Gd, Sm, and so on) apart from Sodium (Na) and Yttrium (Y). Therefore, in order to develop a high frequency dielectric ceramic material having a high quality factor (Q×f) and a stable temperature property of a resonant frequency, instead of performing a separate (or independent) substitution with Strontium (Sr) only, it will be efficient to perform substitution by using Sodium (Na) and Yttrium (Y) along with Strontium (Sr). Herein, it is not preferable to add less than 0.01 mol for the Sodium (Na) and Yttrium (Y) contents because the change in the temperature coefficient ($\tau_f$) of the resonant frequency is minute, and it is also not preferable to exceed 0.1 mol for the Sodium (Na) and Yttrium (Y) contents because the quality factor becomes largely degraded. Therefore, critical significance lies within the above-described range. The results are similar when using Ca instead of Sr. Meanwhile, it is preferable to include 0.09 to 0.25 mol of Strontium (Sr). However, it is not preferable to depart from this range because any one of the quality factor and temperature coefficient may indicate a low value. It will be apparent that such changes in the properties are inter-connected to one another in accordance with the substitution element along with the substituted amount. And, this may be viewed as an effect that is connected to a change in the crystal structure in accordance with the ionic radius and substituted amount of a substitution element.

TABLE 2

| Number | Composition (mol %) | | | | | | | | | | | | | Shrinkage (%) | $\varepsilon_r$ | Q × f (GHz) | $\tau_f$ (ppm/° C.) |
|---|---|---|---|---|---|---|---|---|---|---|---|---|---|---|---|---|---|
| | BaO | SrO | Na$_2$O | | MgO | Y$_2$O$_3$ | | WO$_3$ | | Me$_2$O$_5$ | | | | | | | |
| Comparative Example 1 | 97 | 0 | Na | 1 | 50 | Y | 2 | 49 | | Ta | 1 | | | 21.26% | 18.77 | 237188 | −23.24 |
| Comparative Example 2 | 96 | 0 | Na | 2 | 48 | Y | 4 | 48 | | Ta | 2 | | | 22.00% | 19.01 | 183600 | −13.85 |
| Comparative Example 3 | 95 | 0 | Na | 3 | 48 | Y | 6 | 47 | | Ta | 3 | | | 22.20% | 19.29 | 174078 | −13.96 |
| Comparative Example 4 | 94 | 0 | Na | 4 | 48 | Y | 8 | 46 | | Ta | 4 | | | 21.86% | 19.65 | 160964 | −10.76 |
| Comparative Example 5 | 93 | 0 | Na | 5 | 48 | Y | 10 | 45 | | Ta | 5 | | | 22.53% | 18.69 | 128553 | −5.64 |
| Exemplary Embodiment 1 | 90 | 10 | Na | 0 | 49 | Y | 1 | 49 | | Ta | 1 | | | 23.27% | 19.75 | 92627 | −9.35 |
| Exemplary Embodiment 2 | 90 | 10 | Na | 0 | 48 | Y | 2 | 48 | | Ta | 2 | | | 23.87% | 20.25 | 116229 | −7.06 |

TABLE 2-continued

| Number | Composition (mol %) | | | | | | | | Shrinkage (%) | $\varepsilon_r$ | Q × f (GHz) | $\tau_f$ (ppm/° C.) |
| --- | --- | --- | --- | --- | --- | --- | --- | --- | --- | --- | --- | --- |
| | BaO | SrO | Na$_2$O | | MgO | Y$_2$O$_3$ | | WO$_3$ | Me$_2$O$_5$ | | | |
| Exemplary Embodiment 3 | 90 | 10 | Na | 0 | 47 | Y | 3 | 47 | Ta | 3 | 23.20% | 20.27 | 125525 | −4.74 |
| Exemplary Embodiment 4 | 90 | 10 | Na | 0 | 46 | Y | 4 | 46 | Ta | 4 | 23.93% | 20.87 | 129157 | −2.38 |
| Exemplary Embodiment 5 | 90 | 10 | Na | 0 | 45 | Y | 5 | 45 | Ta | 5 | 23.93% | 20.82 | 123299 | 0.00 |
| Exemplary Embodiment 6 | 85 | 15 | Na | 0 | 48 | Y | 2 | 48 | Ta | 2 | 22.72% | 20.57 | 124553 | 4.97 |
| Exemplary Embodiment 7 | 85 | 15 | Na | 0 | 46 | Y | 4 | 46 | Ta | 4 | 22.64% | 20.76 | 126554 | 5.85 |
| Exemplary Embodiment 8 | 90 | 10 | Na | 0 | 48 | Y | 2 | 48 | Nb | 2 | 22.93% | 19.51 | 124757 | −8.21 |
| Exemplary Embodiment 9 | 90 | 10 | Na | 0 | 46 | Y | 4 | 46 | Nb | 4 | 22.93% | 20.04 | 144337 | 1.19 |
| Exemplary Embodiment 10 | 90 | 10 | Na | 2 | 48 | Y | 4 | 48 | Nb | 2 | 23.54% | 20.37 | 138552 | −1.37 |

Figure 3:
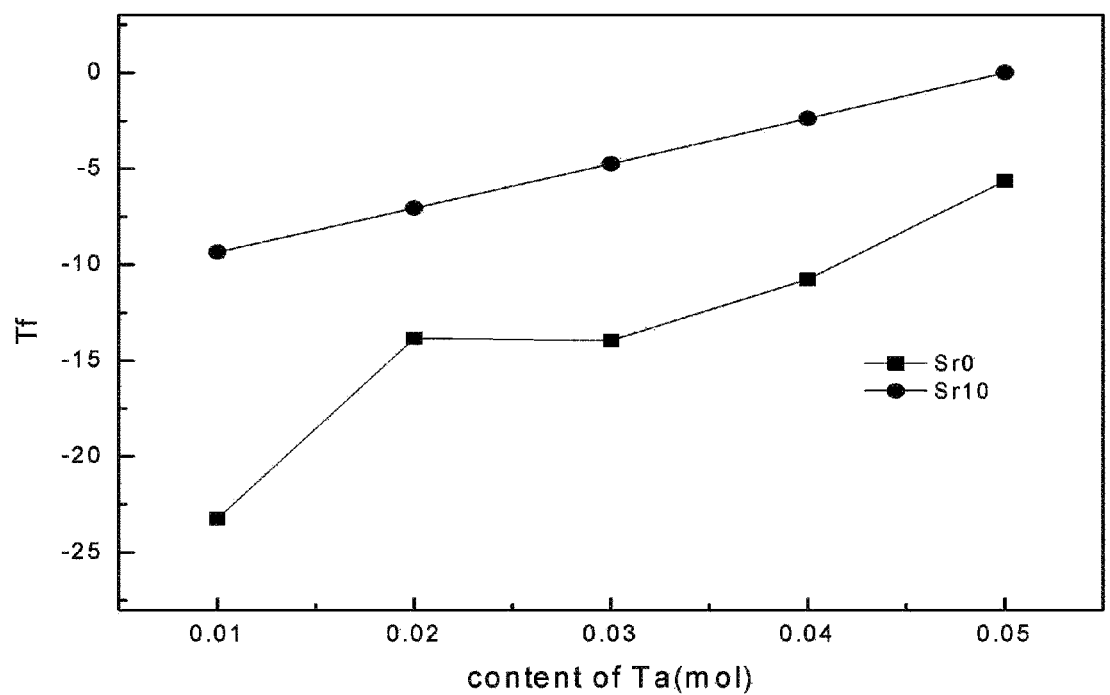
FIG. 3 is a graph showing changes in a temperature coefficient of a resonance frequency according to Me content in a $(Ba_{1-a-b}Ma_aMb_b)(Mg_{0.5-c}Y_cW_{0.5-e}Me_e)O_3$-type high frequency dielectric ceramic material according to an exemplary embodiment of the present invention.

Table 2 shows examples of not only substituting (or replacing) Barium (Ba) with an alkaline earth metal element, as shown in Table 1, but also substituting (or replacing) Tungsten (W) with a Vanadium group metal element of a +5 oxidation state and quantitatively adding a metal element of a +3 oxidation state (Sc, Sm, Gd, Yb, Dy, and so on), such as Yttrium (Y), in order to perform charge compensation. Herein, the comparative example corresponds to a case of performing substitution with an alkali metal element only. As shown in FIG. 3, it is shown that the temperature coefficient of a resonant frequency may be effectively controlled. Herein, although it is not shown in the table, the results are similar when applying a Lanthanide metal element of a +3 oxidation state, such as Sc, Sm, Gd, Yb, Dy, and so on, or a Boron group metal element, such as In, in the place of Yttrium (Y).

More specifically, the temperature coefficient of a resonant frequency shows a tendency to linearly increase in accordance with an increasing amount of Strontium (Sr) and Tantalum (Ta). Moreover, the temperature coefficient gradually increases in case Strontium (Sr) and Tantalum (Ta) are added together. Additionally, as shown in Table 2, in case of adding Strontium (Sr) along with a Vanadium group metal element of a +5 oxidation state (e.g., Nb, Ta), it is advantageous in that a decrease in the quality factor can be minimized. Herein, it is preferable to maintain a ratio ranging from 0.01 to 0.05 mol (1 to 5 mol %) of the Vanadium group metal element of a +5 oxidation state. Herein, it is not preferable to add less than 0.01 mol because the change in the temperature coefficient (τf) of the resonant frequency is too small, and it is also not preferable to exceed 0.05 mol because the quality factor becomes largely degraded.

Therefore, the temperature coefficient of a resonant frequency is an important factor in the components design along with the quality factor. Accordingly, in order to prepare a high frequency dielectric ceramic material composite having a high quality factor and a stable temperature property, it will be very efficient to partly substitute (or replace) Barium (Ba) with an alkali metal or an alkaline earth metal element and, for compensation, to quantitatively add, in combination, a metal element of a +3 oxidation state in the place of Magnesium (Mg) and a metal element of a +5 oxidation state in the place of Tungsten (W). It will be apparent that such changes in the properties are connected to a change in the crystal structure in close relation to the ionic radius and substituted amount of a substitution element.

It will be apparent to those skilled in the art that various modifications and variations can be made in this specification without departing from the spirit or scope of this specification. Thus, it is intended that this specification covers the modifications and variations of this invention provided they come within the scope of the appended claims and their equivalents. It is also apparent that such variations of this specification are not to be understood individually or separately from the technical scope or spirit of this specification.

The invention claimed is:

1. A BMW-type high frequency dielectric ceramic material being configured of a $(Ba_{1-a-b}Ma_aMb_b)(Mg_{0.5-c}Mc_cW_{0.5})O_3$ composition, wherein Ma and Mb respectively represent an alkali metal and an alkaline earth metal, wherein Mc represents a metal of a +3 oxidation state, wherein each of a and c is within a range of 0.01 to 0.1, and wherein b is within a range of 0.09 to 0.25.

2. The BMW-type high frequency dielectric ceramic material of claim 1, wherein the $(Ba_{1-a-b}Ma_aMb_b)(Mg_{0.5-c}Mc_cW_{0.5-e}Me_e)O_3$ composition is configured by further substituting part of W with Me, Me being a metal element of a +5 oxidation state, and wherein e is within a range of 0.01 to 0.05.

3. The BMW-type high frequency dielectric ceramic material of claim 1, wherein the Ma is an alkali metal element of a +1 oxidation state being indicated as Ma$_2$O, and wherein any one of Na, K, and Li is selected as the Ma.

4. The BMW-type high frequency dielectric ceramic material of claim 1, wherein the Mb is an alkaline earth metal element of a +2 oxidation state being indicated as MbO, and wherein any one of Sr and Ca is selected as the Mb.

5. The BMW-type high frequency dielectric ceramic material of claim 1, wherein the Mc is a Lanthanide group metal element of a +3 oxidation state being indicated as Mc$_2$O$_3$, and wherein any one of Sc, Y, Sm, Gd, Yb, and Dy is selected as the Mc, or wherein the Mc is a Boron group metal element being indicated as Mc$_2$O$_3$, and wherein In is selected as the Mc.

6. The BMW-type high frequency dielectric ceramic material of claim 2, wherein the Me is a Vanadium group metal element of a +5 oxidation state being indicated as $Me_2O_5$, and wherein any one of Nb and Ta is selected as the Me.

7. The BMW-type high frequency dielectric ceramic material of claim 1, wherein the Ma and the Mb are both added for a purpose of achieving a quality factor greater than or equal to 100,000 GHz.

8. The BMW-type high frequency dielectric ceramic material of claim 2, wherein the Mb and the Me are separately or both added for a purpose of achieving a temperature coefficient within a stable range of ±10 ppm/° C.

* * * * *